United States Patent [19]
Johnson, Jr. et al.

[11] Patent Number: 4,464,817
[45] Date of Patent: Aug. 14, 1984

[54] OPTICAL WAVEGUIDE TERMINATING APPARATUS

[75] Inventors: Keith Johnson, Jr., Manheim; Robert A. Long; William R. Over, both of Harrisburg, all of Pa.

[73] Assignee: AMP Incorporated, Harrisburg, Pa.

[21] Appl. No.: 381,497

[22] Filed: May 24, 1982

[51] Int. Cl.³ ............................................ H01R 43/04
[52] U.S. Cl. ................................ 29/33 M; 29/564.1; 29/564.8
[58] Field of Search ............... 29/33 M, 564.1, 564.2, 29/564.6, 564.7, 564.8, 753, 335, 862, 861, 749

[56] References Cited

U.S. PATENT DOCUMENTS

| | | | |
|---|---|---|---|
| 2,897,870 | 8/1959 | Berg | 153/1 |
| 3,046,636 | 7/1962 | Albright | 29/33.5 |
| 3,292,236 | 12/1966 | Busler et al. | 29/33.5 |
| 3,456,324 | 7/1969 | Hahn et al. | 29/203 |
| 3,659,328 | 5/1972 | Klein | 29/564.1 X |
| 3,789,485 | 2/1974 | Gudmestad | 29/564.8 X |
| 3,955,275 | 5/1976 | Loomis et al. | 29/628 |
| 4,074,424 | 2/1978 | Deshich et al. | 29/753 |
| 4,182,017 | 1/1980 | Ford et al. | 29/428 |
| 4,275,619 | 6/1981 | Shimizu | 29/33 M |
| 4,368,948 | 1/1983 | Despouys | 350/96.2 |

Primary Examiner—William R. Briggs
Attorney, Agent, or Firm—F. Brice Faller

[57] ABSTRACT

Optical waveguide terminating apparatus applies a pair of plug members of the type having metal retention sleeves therein to cut and strip the ends of a jacketed optical waveguide cable. Plug members are delivered to a insertion station attached to a metal carrier strip and are clamped securely between an anvil and an upper clamp which move together vertically under the action of followers riding in cam slots in a moving cam block, which also determines movement of other components. Cable is positioned relative to insertion station by aligning exposed fibers in narrow channels in top of shear bar which drops to remove carrier strip and positions cable guide channels in cable feed path. A pair of cam actuated jaws grip the cable and advance the ends toward the terminating station; the guides drop away during this advance to permit the jaws to fully insert the cable ends in the plug member. Cables are pulled back to seat them on lances in the retention sleeves and a hot cutting blade shears the optical fiber protruding beyond the plug members flush therewith.

8 Claims, 22 Drawing Figures

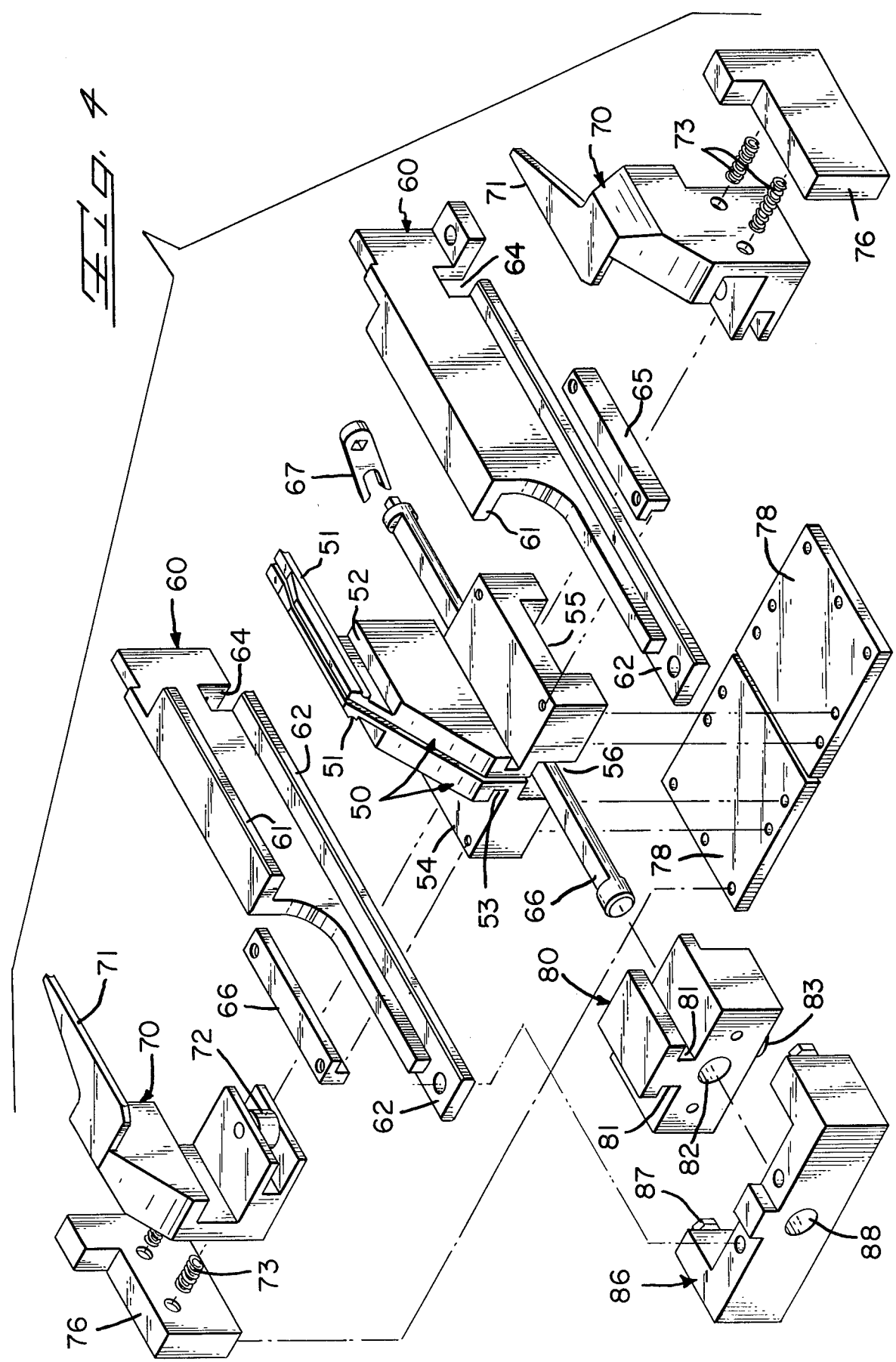

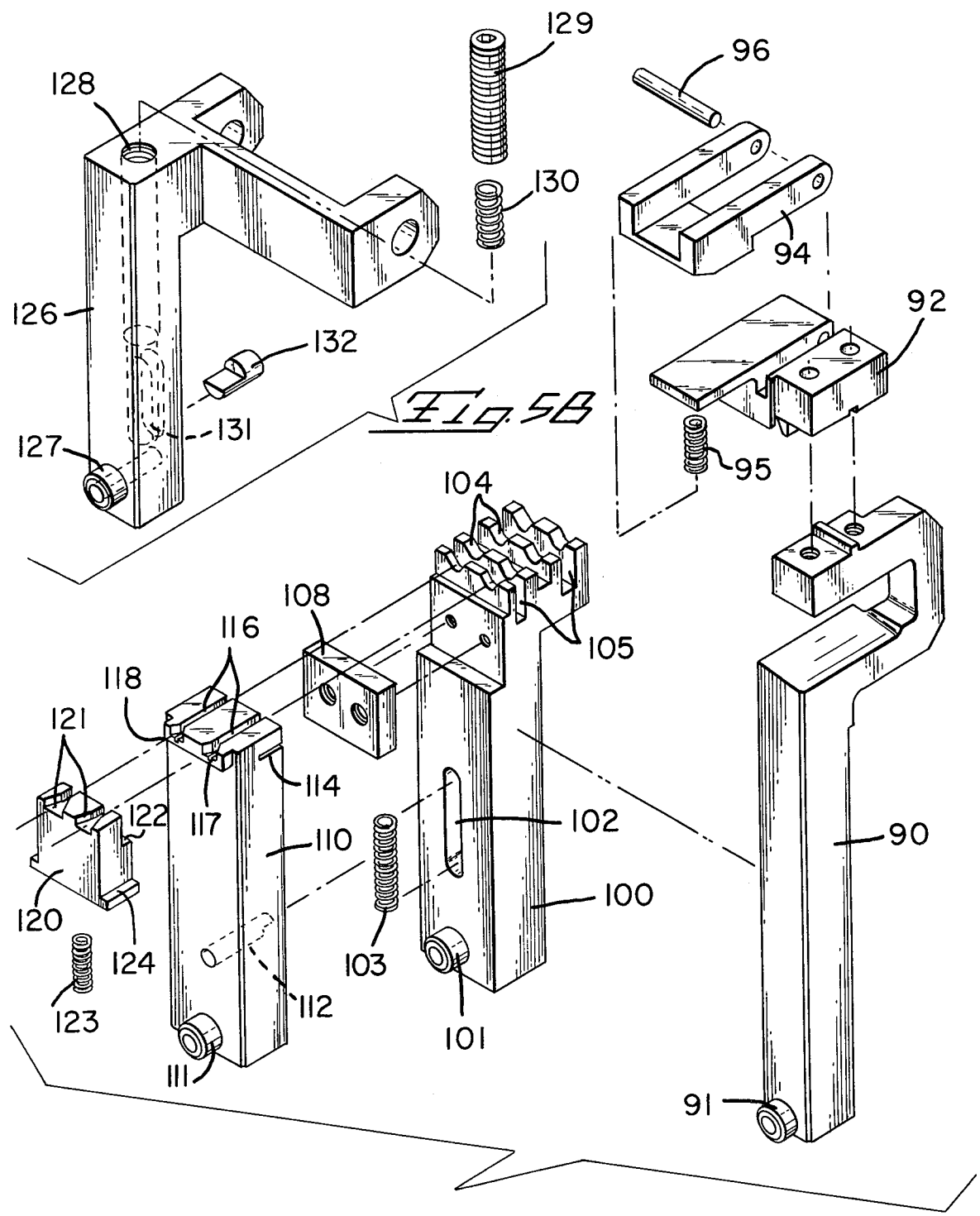

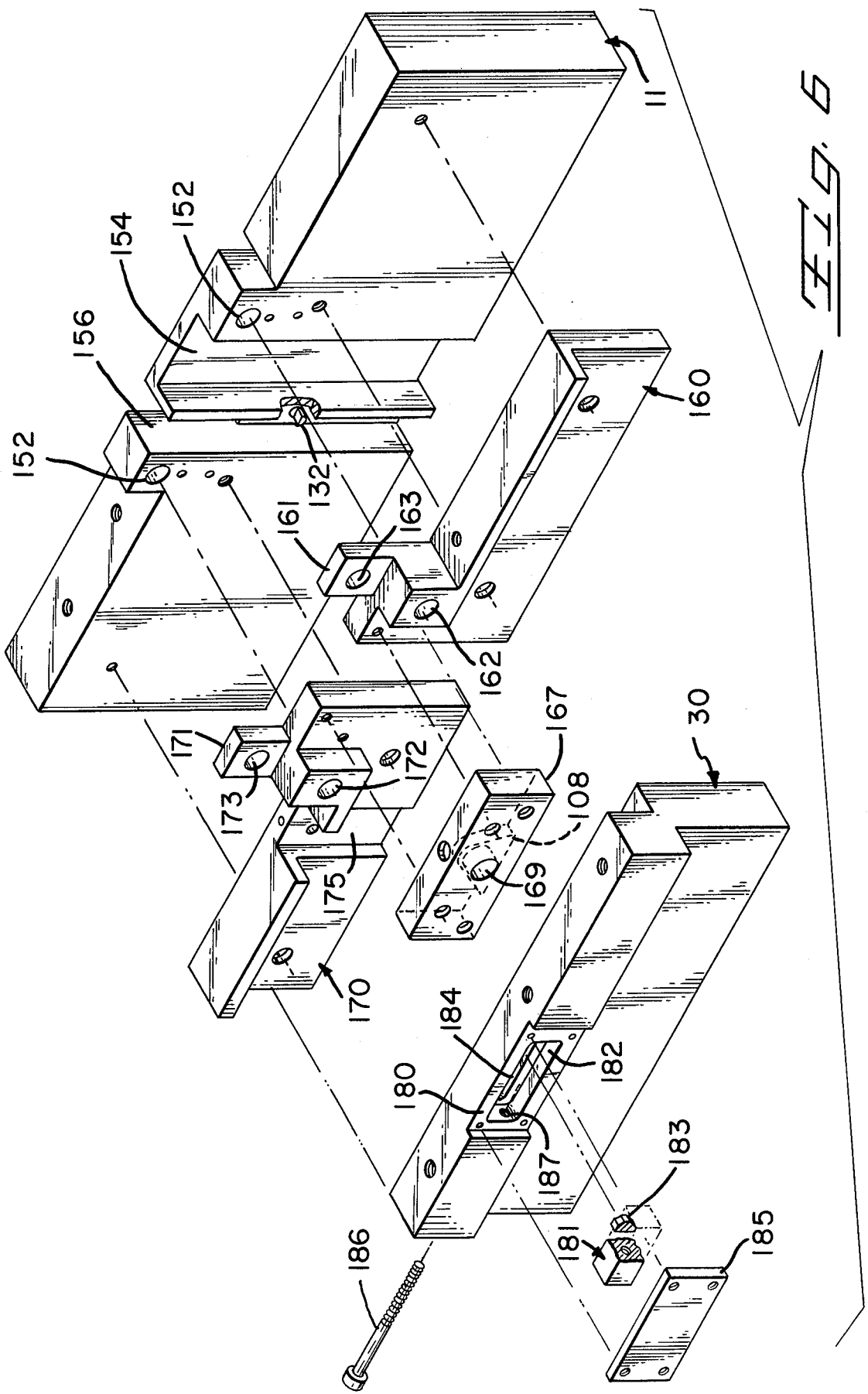

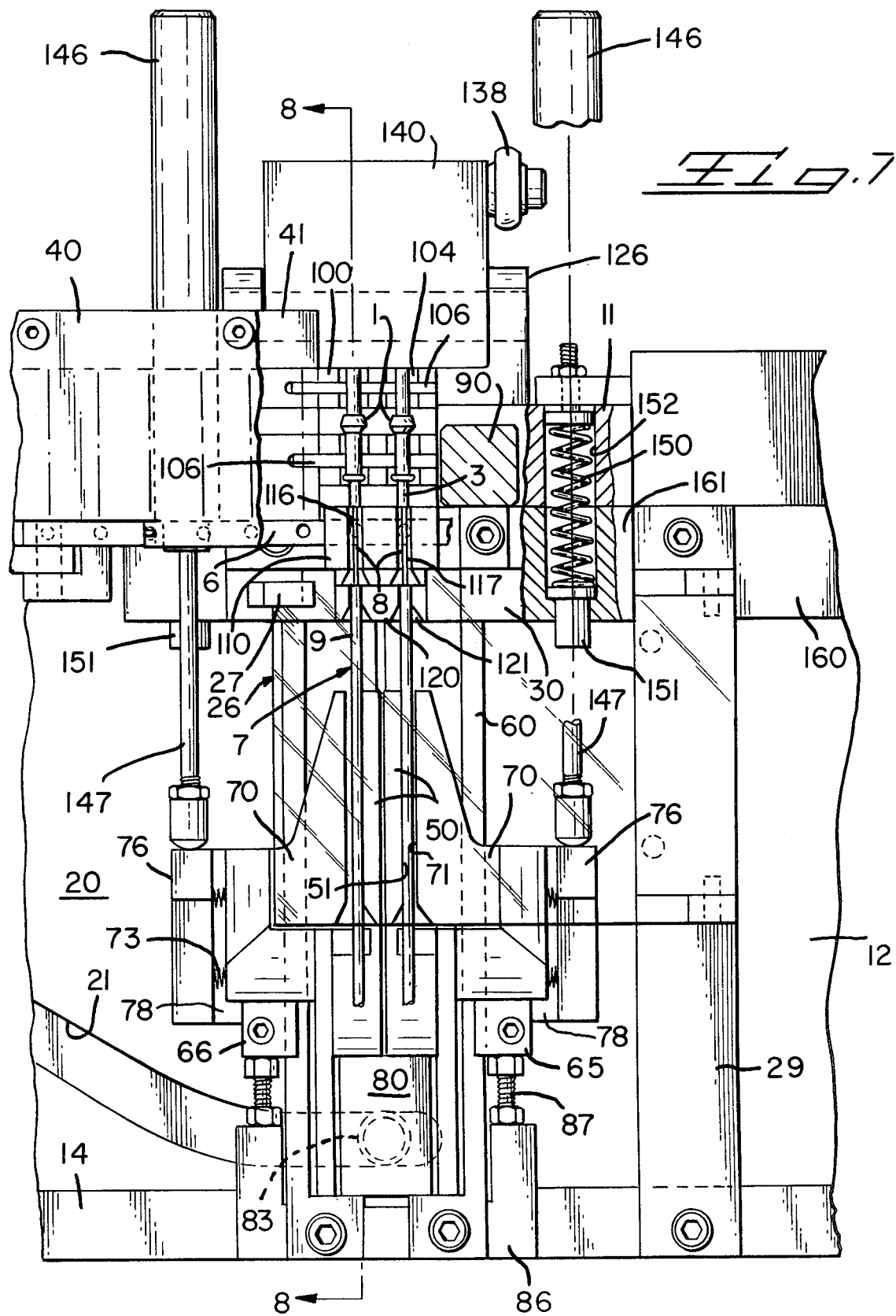

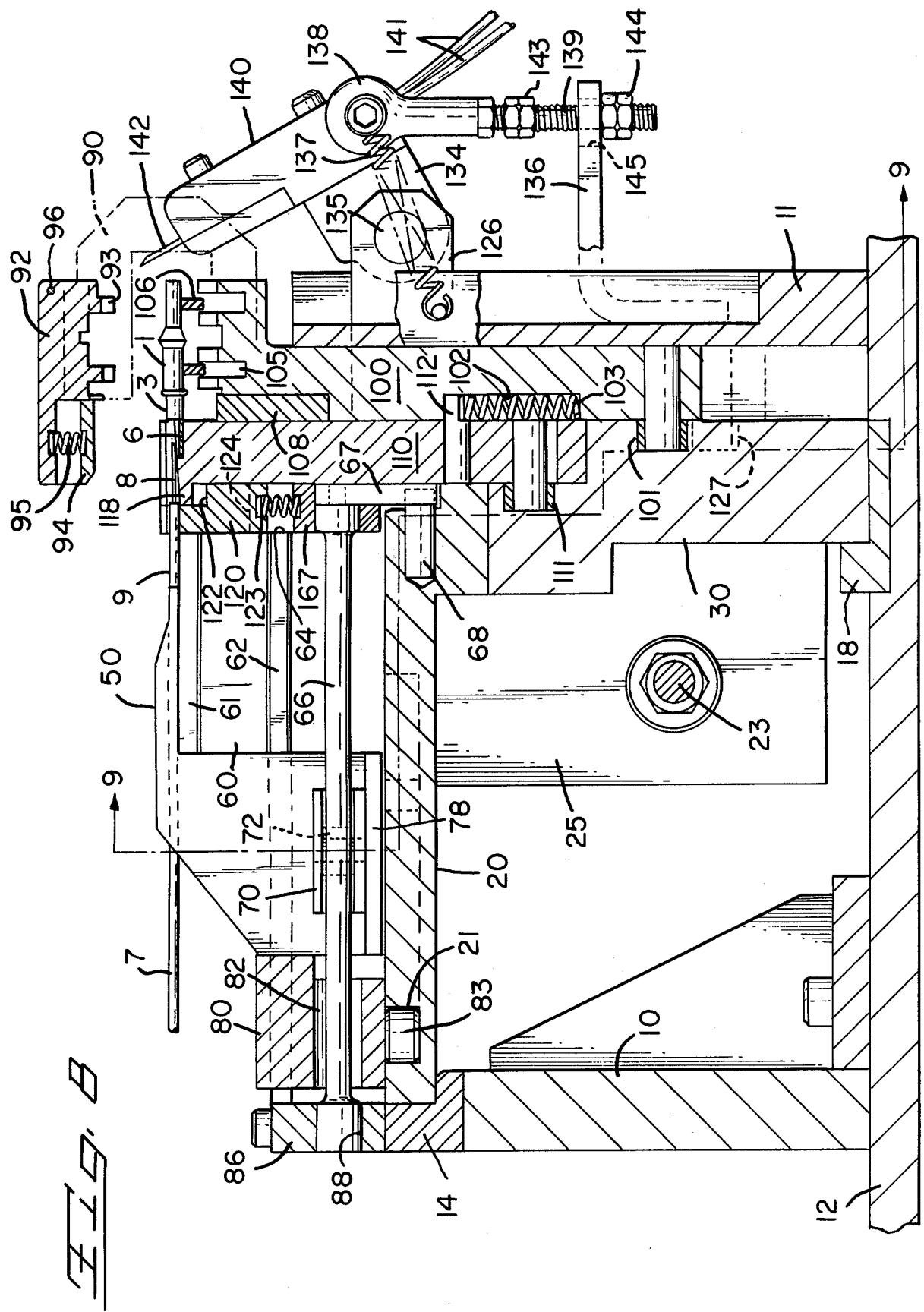

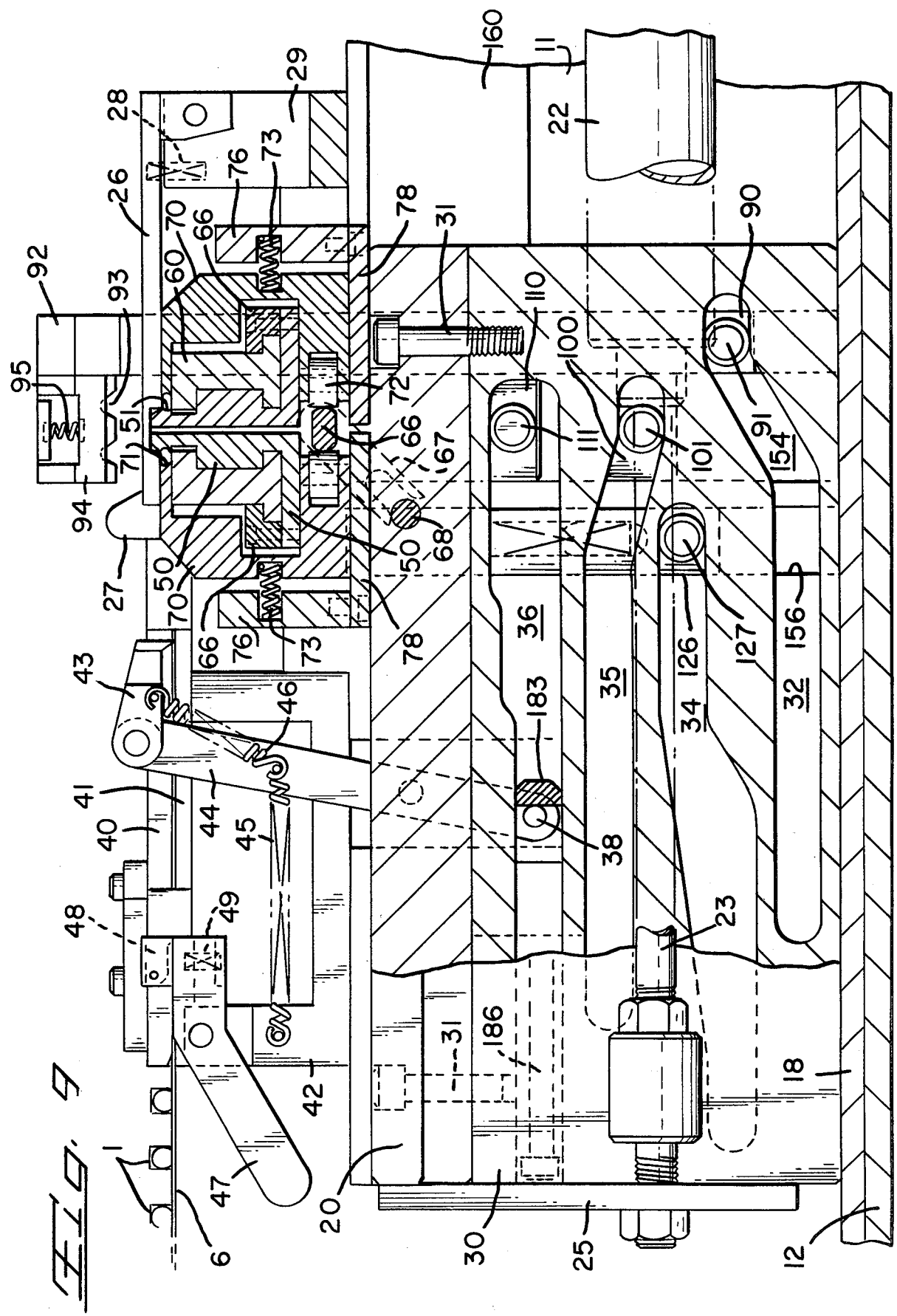

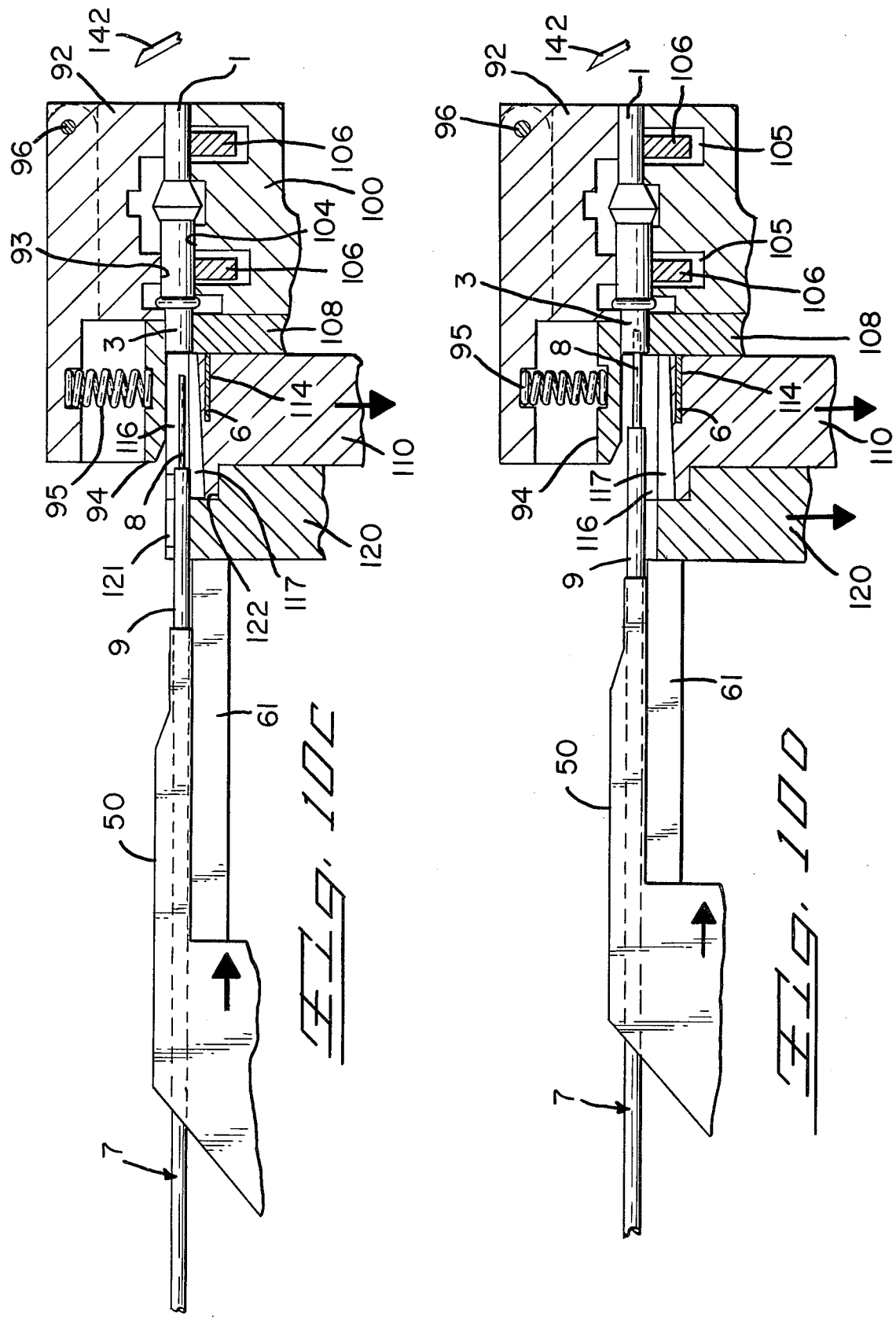

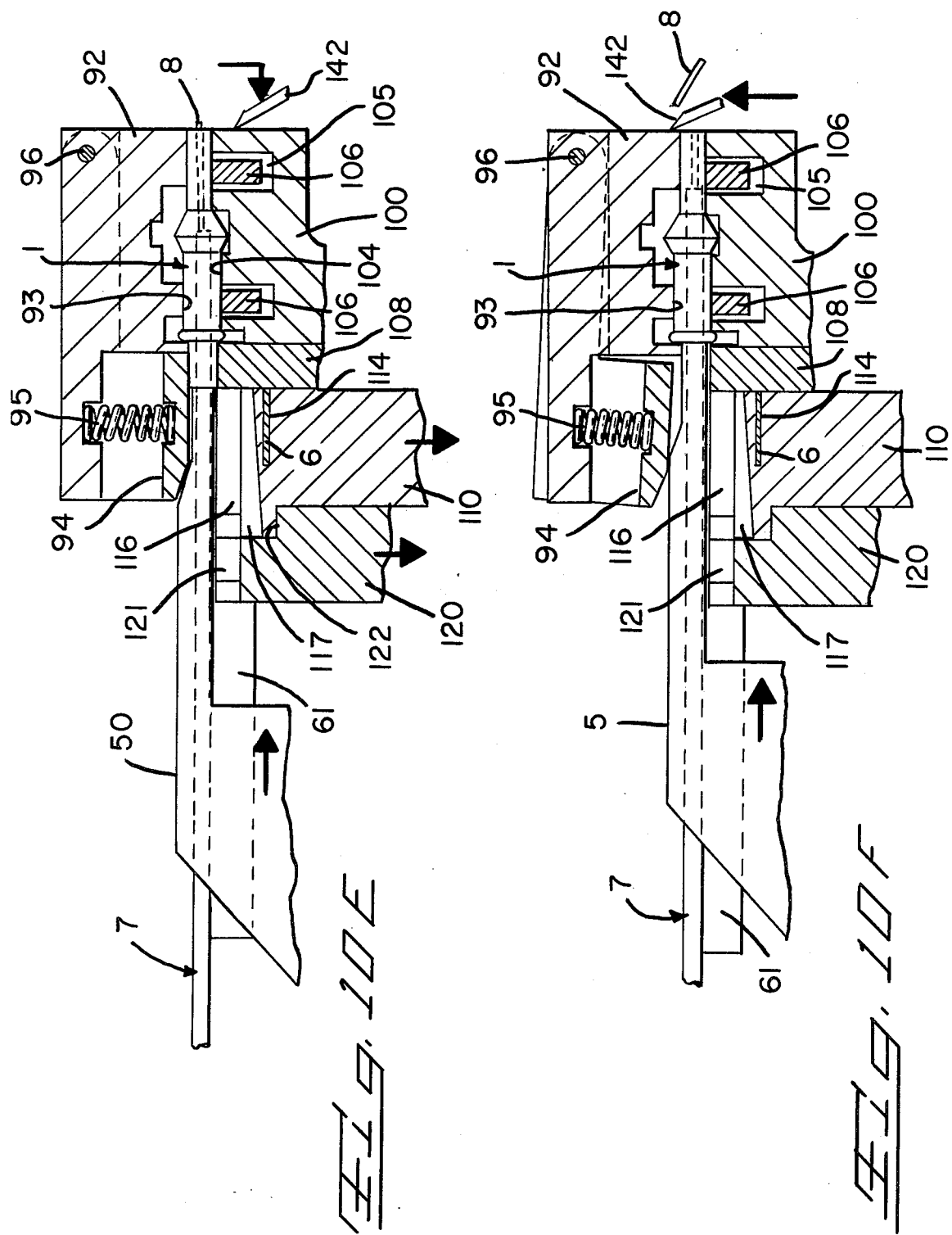

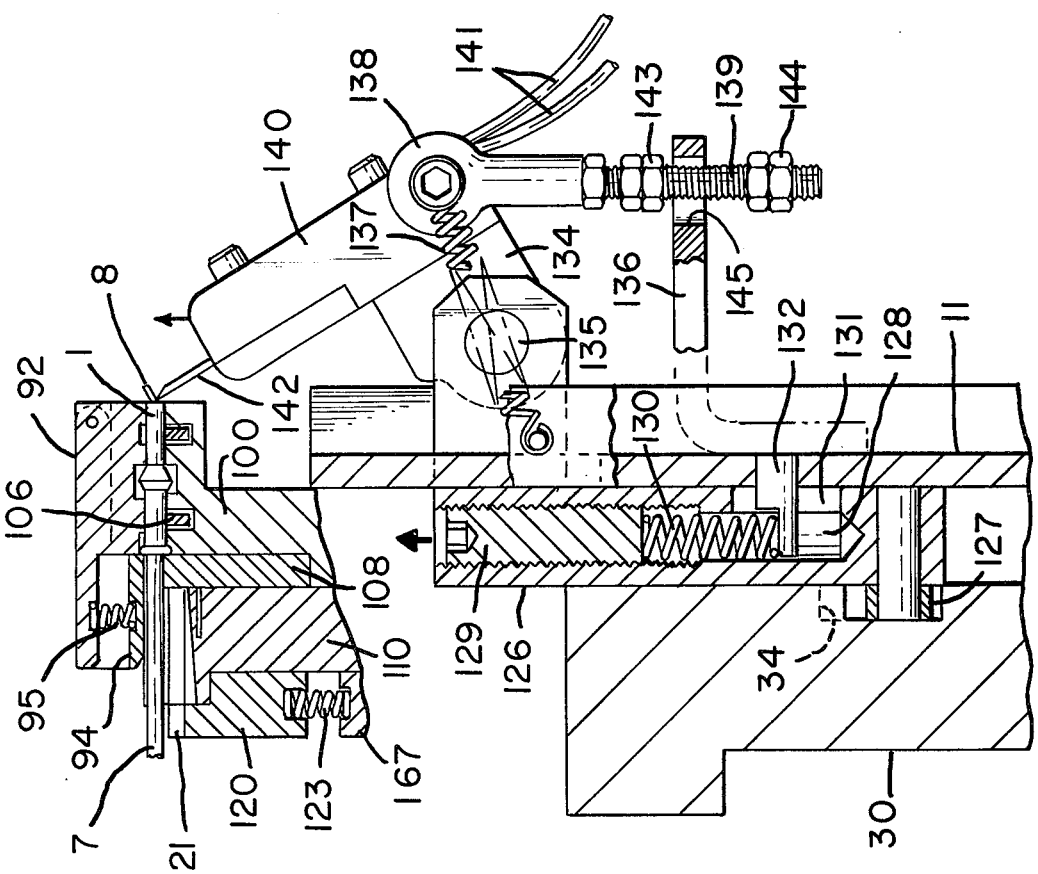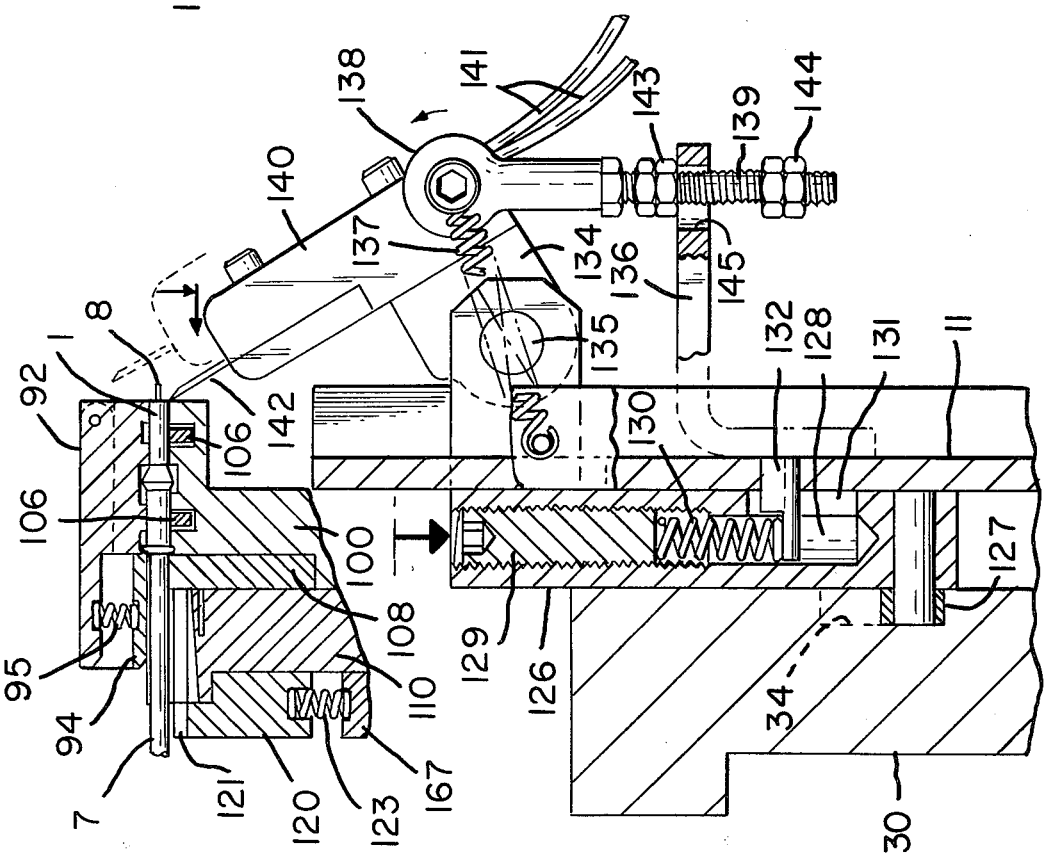

OPTICAL WAVEGUIDE TERMINATING APPARATUS

BACKGROUND OF THE INVENTION

The present invention relates to an apparatus for applying a plug member to the end of a fiber optic waveguide cable.

The rapid growth of fiber optics technology created the need for a low-cost connector which could be readily applied to the end of a fiber optic waveguide cable to facilitate coupling with another cable. Early optical systems required polishing and epoxy bonding techniques, but the development of low attenuation plastic fiber enabled the development of a connector system allowing much faster end finish and assembly. Such a connector, marketed by AMP Incorporated and sold under the name OPTIMATE, is disclosed in U.S. Pat. No. 4,418,983, which is hereby incorporated by reference. The OPTIMATE connector comprises a plastic plug member having a metal retention sleeve therein which receives the end of a waveguide cable which is cut and stripped to expose the optical fiber therein. The sleeve is then pushed into the connector where it is seated by lances on the sleeve which pierce the inside of a bore through the connector or plug member. Lances on the inside of the sleeve pierce the jacket on the cable to position it relative to the plug member, and the fiber is then trimmed flushly with the end of the plug member. The plug member as applied to the end of an optical cable is then mated against another plug member in an open-ended receptacle for continuous optical transmission.

Development of the connector system described above made automation of the terminating procedure desirable from a standpoint of cost and quality control.

SUMMARY OF THE INVENTION

The present invention provides for an apparatus which will simultaneously apply plug members of the type described above to opposite ends of an optical waveguide cable. Plug members are delivered to a insertion station attached to a metal carrier strip which is formed integrally with the retention sleeves. The cable is positioned relative to the plug members by aligning the exposed fibers in fiber guide channels proximate to the insertion station and aligning the jacket in adjacent primary cable guide channels and placing the cable proximate the ends between two pairs of jaws. The apparatus is then actuated and the jaws close to grip the cable. The fiber guide channels drop to leave wider guide channels which will accommodate the cable jacket in the cable feed path, and the jaws advance the cut and stripped ends toward the insertion station. The plug members are firmly gripped between an anvil and an upper clamp which move together under the action of cam followers riding in slots in a cam block which also determines the motion of the jaws and other components. The secondary cable and fiber guide channels are profiled in the top of a shear bar which drops to remove the carrier strip and then drops further with the primary cable guide channels so that the approaching jaws will clear all guide channels. After the cables are fully inserted in the plug members, the jaws pull the cable slightly to seat it on the internal lances in the retention sleeve. A hot cutting blade then cuts the exposed optical fiber ends flush with the end of the plug members.

The principal object of the invention is to permit an operator to rapidly apply a pair of OPTIMATE connectors to the cut and stripped ends of a fiber optic waveguide cable.

Other objects and features of the invention will be apparent upon examination of the appended drawings and detailed description.

BRIEF DESCRIPTION OF THE DRAWINGS

FIG. 4 is an exploded perspective of the waveguide clamping portion of the apparatus.

FIG. 5A is an exploded perspective of the waveguide terminating portion of the apparatus.

FIG. 5B is a perspective of the hot blade pivot holder.

FIG. 6 is an exploded perspective of the rear cam block, guides, and rear support plate.

FIG. 7 is a plan view of the waveguide clamping and terminating portions of the apparatus.

FIG. 8 is a cross section taken along 8—8 of FIG. 7.

FIG. 9 is a cross section taken along line 9—9 of FIG. 8 showing the profile of the cam slots in the rear cam block.

FIGS. 10A through 10F depict the clamping, insertion, and strip shearing operations sequentially.

FIGS. 11A and 11B are fragmentary cross sections showing the fiber shearing operations sequentially.

DETAILED DESCRIPTION OF THE PREFERRED EMBODIMENT

Figure 1:
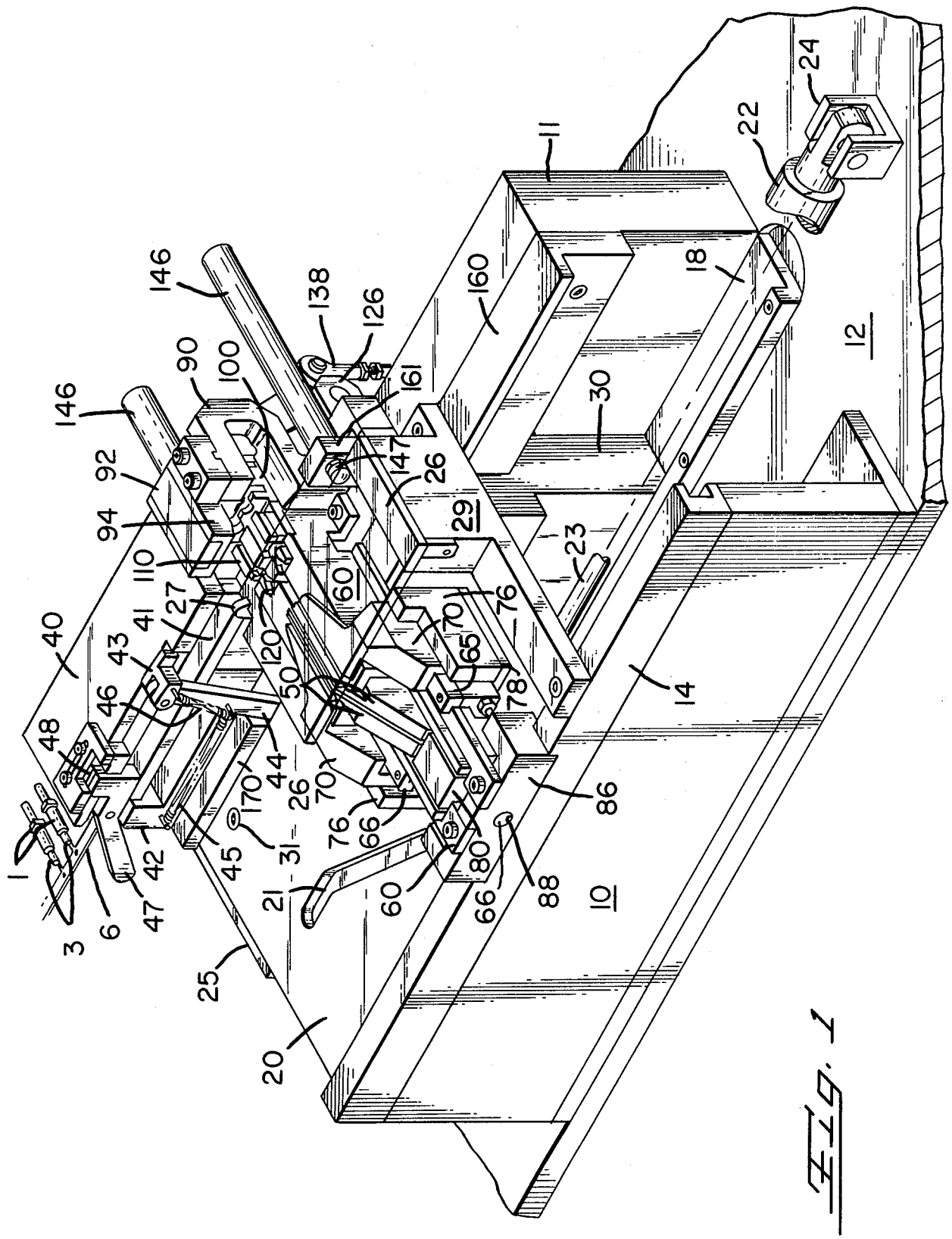
FIG. 1 is a perspective of the optical waveguide connector applicator.

FIG. 1 depicts the waveguide terminating apparatus as fully assembled. Front and rear support plates 10, 11 are fixed to a base plate 12, and right and left cam guides 160, 170 are fixed to rear support plate 11. Rear cam block 30 slides between the cam guides 160, 170 and bottom guide 18, which is fixed to base plate 12. The cam block 30 is fixed to top cam plate 20 by bolts 31; end plate 25 is fixed to both top cam plate 20 and rear cam block 30. Air cylinder 22 is fixed at one end to bracket 24 on base plate 12 and reciprocably drives a rod 23 which is fixed to end plate 25 at the other end. This serves to move the plate 20 which slides through rail 14 at the front edge and drives pusher block 80 towards the rear support plate 11 by means of a follower 83 (not visible) which rides in cam slot 21. The pusher block 80 drives fixed jaws 50 and movable jaws 70 toward cable guides 120. The jaws 50, 70 move along crosspieces 60 which span from shaft support 86 on rail 14 to rear support plate 11. The fixed jaws 50 and stops 76 are bolted to base plates 78, and the movable jaws 70 are carried resiliently between the stops 76 and fixed jaws 50 as will be described in greater detail hereinafter. Crosspiece 29 spans from rail 14 to cam guide 16 and provides a pivotable mount for the transparent plastic cover 26, which fits flushly against the tops of jaws 50, 70 and is held in place by latch 27.

Referring still to FIG. 1, the cam block 30 has cam slots therein (FIG. 9) which effect vertical movement of the upper clamp support 90, anvil 100, shear bar 110, and cable guide block 120. The block 30 also effects rightward movement of feed pawl 43 through feed pawl lever 44 as the block 30 returns to the left. The feed pawl 43 advances waveguide plug members 1 two at a time by means of indexing holes in a metal carrier strip 6, which is integral with metal retention sleeves 3 in the plug members 1. The plug members 1 thus advance between upper and lower strip guide plates 40, 41 toward the anvil 100 where they are firmly clamped for insertion of optical waveguides being advanced by jaws 50, 70. Air cylinders 146 are carried in upright portions 161, 162 of cam guides 160, 170 and act on stops 76 to return jaws 50, 70 after the pusher block 80 retreats as the cam plate 20 moves leftward after waveguide termination.

FIGS. 2A, 2B, and 2C depict the operations of the apparatus schematically. FIG. 2A depicts the ends of two optical cables or waveguides 7 with part of the jackets 9 stripped to expose the transmission fibers 8. These are aligned for reception in retention sleeves 3 by manually placing the waveguides 7 in the apparatus where they are clamped by jaws 50, 70 while the plug members 1 are clamped between anvil 100 and upper clamp 92 (FIG. 1). After clamping, the strip 6 is sheared adjacent the retention sleeve 3, and the waveguide 7 is fed through retention sleeve 3, then held stationary relative thereto while the retention sleeve 3 is pushed into the plug member 1 as shown in FIG. 2B, leaving fiber 8 exposed. The fiber 8 is subsequently sheared as shown in FIG. 2C. FIG. 2D shows the cable 7 as terminated to a plug member 1 in cross section. Note the outer lances 4 which lock the retention sleeve 3 in the plug member 1 and the inner lances 5 which lock the jacket 9 in the retention sleeve 3. An important function of the apparatus is to give the waveguide a backward pull after insertion to set the inner tines 5 prior to shearing the fiber 8.

Figure 2:
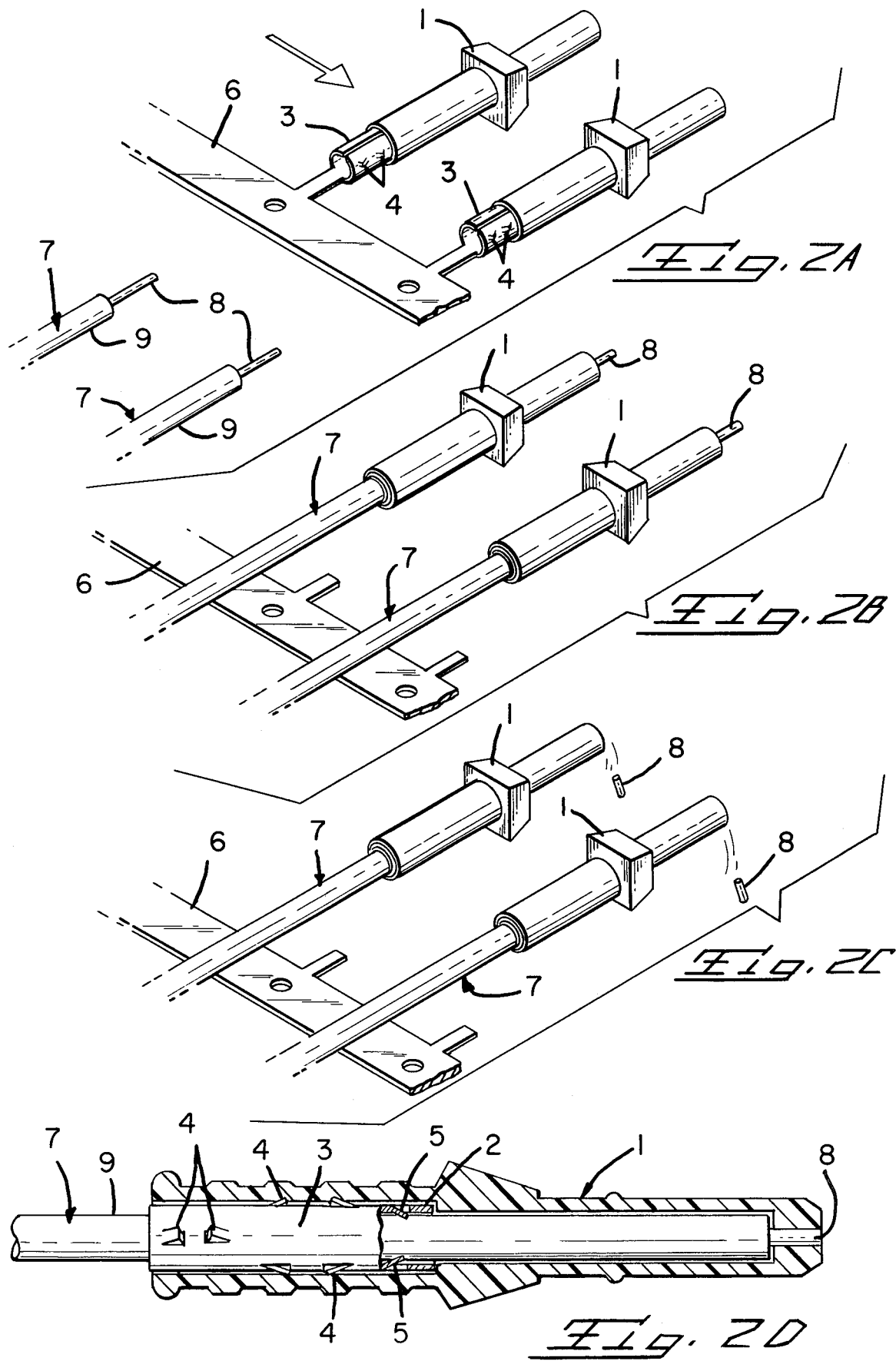
FIG. 2A is a perspective of the waveguide and connector in strip form.
FIG. 2B is a perspective of the waveguide as terminated prior to shearing excess optical fiber.
FIG. 2C is a perspective of the waveguide as terminated to a connector.
FIG. 2D is a cross section of the waveguide as terminated to a connector.
Figure 3:
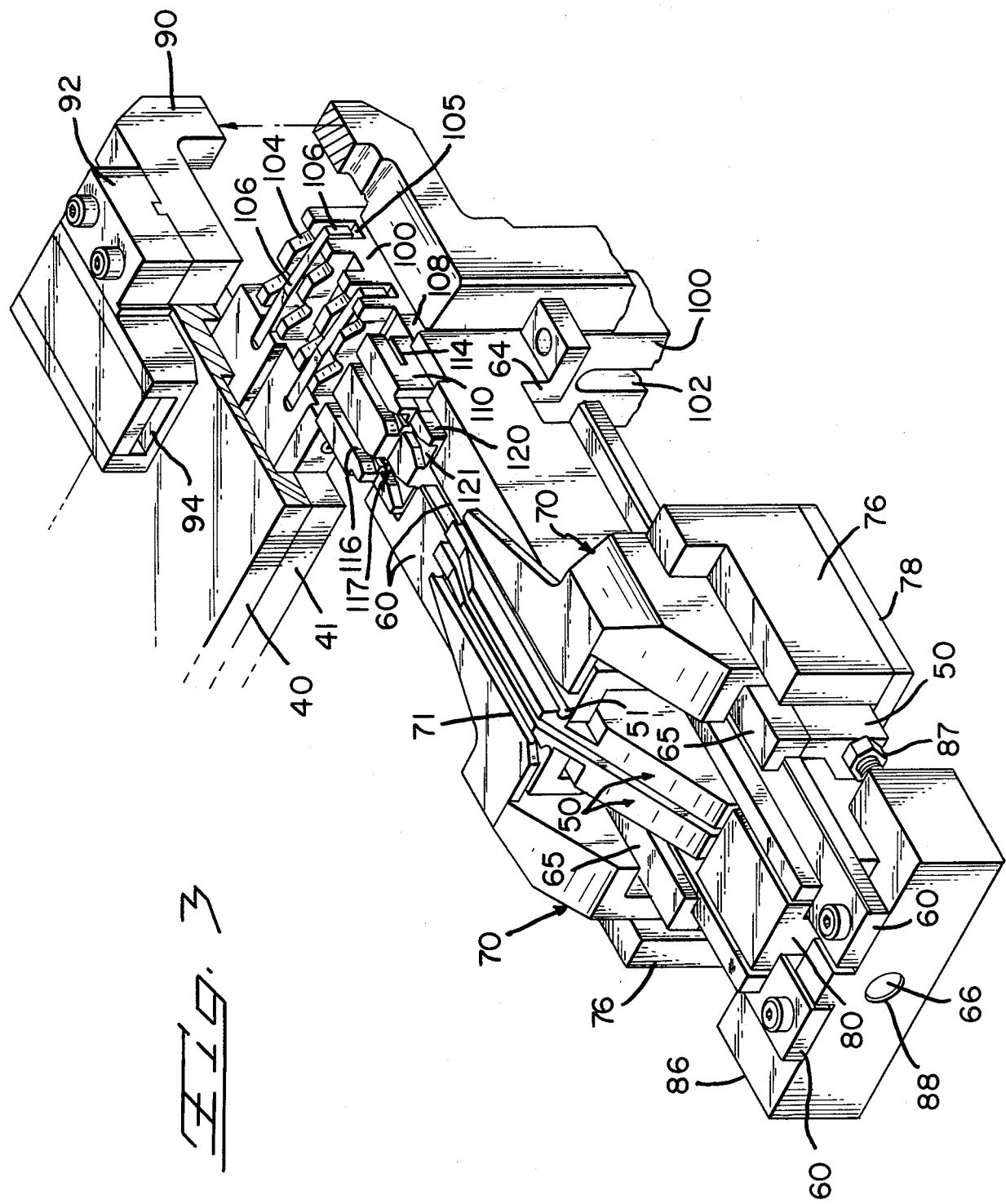
FIG. 3 is a perspective of the waveguide clamping and terminating portions of the apparatus.

FIG. 3 depicts the waveguide clamping and terminating portions of the apparatus in greater detail. Fixed jaws 50 each have an arcuate, outwardly facing waveguide clamping surface 51 which faces a similar arcuate clamping surface 71 on each movable jaw 70. Guides 65 are fixed to fixed jaws 50 and form journals for sliding along crosspieces 60. Stops 87 in the form of bolts threaded into shaft support 86 serve as adjustable means for limiting travel of the fixed jaws 50. Bore 88 serves as a journal for camming bar 66 (FIG. 4), which serves to advance each clamping surface 71 towards the adjacent clamping surface 51. Cable guide block 120 has parallel primary cable guide channels 121 for initial alignment of the waveguides, and shear bar 110 has parallel fiber guide channels 117 in which the fibers 8 are placed during intial alignment and secondary cable guide channels 116 through which the waveguides are advanced after the shear bar 110 drops, shearing carrier strip 6 (FIG. 1), which passes through slot 114, against shear blade 108. Passages 64 through the crosspieces 60 serve to limit upward travel of cable guide block 120. The plug members 1 (FIGS. 1 and 2) are delivered between upper and lower strip guide plates 40, 41 onto fingers 106 which are fixed to the lower guide plate 41 and hold the plug members 1 above anvil 100 until the anvil 100 rises to receive the plug members 1 in cradles 104 as the fingers are received in slots 105 in the anvil. The upper clamp support 90 carries upper clamp 92 which likewise has cradles for holding the plug members. These movements are shown in greater detail in FIGS. 10A through 10F.

FIG. 4 shows the waveguide clamping portion of the apparatus with component parts exploded. Each crosspiece 60 has an upper rail 61 and a lower rail 62 which ride in upper and lower channels 52, 53 in fixed jaws 50, and a table surface 54 to which the guide 65 is fixed. The fixed jaws 50 have cam bar channels 56 in the underside thereof which extend parallel to the crosspieces 60 and movable jaw guides 55 which extend perpendicular to crosspieces 60. The channels 55 receive the bottom portions of the movable jaws 70, which are contained against base plates 78. Inward movement of the jaws 70 is effected by camming bar 66, which is journaled in bore 88 at one end and passes through bore 82 in the pusher block 80 and between the fixed jaws 50 and the base plates 78. The camming bar 66 is journaled in the pivot block 167 (FIGS. 8 and 9) at the other end, where it carries a forked member 67 which effects rotation of the bar 66 by means of a pin 68 (FIGS. 8 and 9) fixed in the top cam plate 20. The camming bar 66 rides against followers 72 which are carried by movable jaws 70 to move the jaws 70 against springs 73 between the jaws 70 and stops 76.

FIGS. 5A and 5B show the movable components in the waveguide terminating portion of the apparatus. Upper clamp support 90 carries a cam follower 91 at one end and has upper clamp 92 fixed to the other end. Top guide plate 94 is hinged to the clamp 92 by pivot pin 96 and urged downward by spring 95 between the clamp 92 and the guide 94. Anvil 100 rides next to clamp support 90 and carries follower 101 at the lower end. The anvil has a slot 102 therein which carries a spring 103 and further has a shear blade 108 fixed adjacent to the top thereof, which has cradles 104 and slots 105 profiled therein. Shear bar 110 rides against the face of anvil 100 so that pin 112 fits in slot 102 against spring 103, and the bar 110 can move downward relative to the anvil 100 to shear strip 6 (FIGS. 1 and 2) in slot 114 from the retention sleeves 3. The shear bar 110 has a cam follower 111 at one end and secondary cable guide channels 116 in the other end which extend onto an overhang 118 which extends over ledge 122 of adjacent cable guide block 120, which has primary cable guide channels 121 in the top thereof which are sized to accommodate the jacket 9 (FIG. 2). Flanges 124 ride in passages 64 (FIGS. 3 and 4) in the crosspieces 60 and serve to limit upward travel of the cable guide block 120. Referring to FIG. 5B, the hot blade pivot holder 126 carries a follower 127 at one end and has a bore 128 at the other end which accepts a spring 130 which is held in the bore by bolt 129. The spring 130 bears against peg 132 mounted in rear wall 11 (FIG. 6).

FIG. 6 depicts the rear cam block 30, cam guides 160, 170, and rear support plate 11. The rear support plate 11 has a channel 154 which receives the upper clamp support 90 and anvil 100 therein, and a channel 156 which receives the hot blade pivot holder 126 therein. Adjacent the channels 154, 156 are recesses 152 which receive the springs 150 for test buttons 151 (FIG. 7). The right cam guide 160 is fixed to plate 11 to the right of channel 152 and has an upper extension 161 having a bore 163 therethrough which serves as a mount for one of air cylinders 146. Below bore 163 is a bore 162 which serves as a mount for one of test buttons 151. Left cam guide 170 is fixed to plate 11 to the left of channel 156 and has an upper extension 171 having a bore 173 therethrough which serves as a mount for one of air cylinders 146. Below bore 173 is a bore 172 which serves as a mount for one of test buttons 151. Channel 175 provides a mounting point for feed pawl lever 44 (FIG. 1) and clearance for pivoting thereof. Pivot block 167 is fixed to guides 160, 170 and across the level of recesses 152 in rear support plate 11. The block 167 has a recess 168 in one face thereof and a hole 169 therethrough which acts as a journal for shaft 66. The recess 168 provides clearance for fork 67 (see also FIGS. 4, 8 and 9). Cam block 30 has a cutaway 180, a recess 182, and a slot 184 which communicates with the cam slot 36 (FIG. 9) opposite face of the block 30. The recess 182 receives strip feed adjustor block 181 therein which is held in place by an adjustable bolt 186 passing through bore 187. The block 181 has attached thereto a pawl drive block 183 which protrudes into cam slot 36 (FIG. 9). The block 181 is enclosed in recess 182 by plate 185, which is fixed into cutaway 180.

FIG. 7 is a plan view of the cable clamping and terminating portion of the apparatus after the ends of cable 9 are aligned therein for termination to plug members 1. The ends of cable 7 are aligned in primary cable guide channels 121 of cable guide block 120 so that the ends of the jackets 9 abut shear bar 110 as the exposed ends of fiber 8 fit closely into fiber guide channels 117 in the top of the shear bar 110. Plug members 1 rest on fingers 106 which extend from lower strip guide plate 41 over the anvil 100. Only centerlines of successive plugs 1 are indicated as strip 6 passes between upper strip guide plate 40 and the lower plate 41. Cradles 104 on anvil 100 are positioned for the plug members 1 to rest thereon when the anvil 100 rises. Rear cam block 30 attached to top cam plate 20 moves right, turning fork 67 (FIG. 9) which causes movable jaws 70 to move toward each other to clamp the cables 9 between arcuate clamping surfaces 71 and arcuate clamping surfaces 51 on fixed jaws 50. Immediately thereafter the pusher block 80 advances as follower 83 moves in cam slot 21, as the top plate 20 moves right with the rear cam block 30 to which it is fixed. The pusher 80 bears on fixed jaws 70 to advance the cables 9 through secondary cable guide channels 116 as the shear bar 110 drops, the fibers pass into the plug members 1, and the leading ends of jaws 50, 70 push the retention sleeves 3 into the plug members 1. At this point the stops 76 abut the test buttons 151, which compresses the springs 150 passing through bores 152 in rear plate 11 and in the bore 162, 172 in right and left cam guides 160, 170 respectively. This sequence will be shown in greater detail in FIGS. 10A to 10F.

Referring still to FIG. 7, it will be apparent that the pusher block 80, being unattached to the jaws 70, will not effect their return. Thus as the pusher returns, the test buttons 151 push on the stops 76 to seat the cable jackets 9 on the tines 5 (FIG. 2C) in the retention sleeves 3. The fiber 8 exposed from plug member 1 is subsequently sheared as shown in FIGS. 11A and 11B, after which the plug members 1 are unclamped and the air cylinders 146 effect the return of jaws 50, 70 as shafts 147 bear against stops 76.

FIG. 8 shows the apparatus in cross section taken through the primary moving components. Drive rod 23 is fixed to end plate 25 which acts on top cam plate 20 and rear cam block 30. Pin 68 fixed in plate 20 thus moves toward the viewer to pivot fork 67, which acts on followers 72 in movable jaws 70 to collapse jaws 70 toward jaws 50 which clamps the cable 9. Follower 83 then moves in slot 21 to move pusher block 80 rightward. Movement of cam block 30 toward the viewer causes follower 101 and anvil 100 to ride upward so that lower cradles 104 move up to capture the plug member 101 against upper cradles 93 as the upper clamp 92 moves downward in response to cam actuated vertical movement of upper clamp support 90. Fingers 106 are received in slots 105 in the anvil 100. Follower 111 and shear bar 110 move downward which shears carrier strip 6 against the shear bar 108 fixed to anvil 100, and overhang 118 bears on ledge 122 to drop the cable guide block 120, compressing spring 123 against pivot block 167. Upward travel of the guide block 120 is limited by flanges 124 riding in passages 64. Spring 103 mounted in slot 102 urges pin 112 and shear bar 110 upward as the block 30 returns, since the follower 111 does not return positively due to the profile of the cam slot 36 (FIG. 9) in which it rides. Hot blade pivot holders 126 is driven downwardly by follower 127 as will be described in greater detail in conjunction with FIGS. 11A and 11B. Blade support pivot 134 attaches to pivot holder 126 by pin 135 to rotate the pivot 134 about rod end 138, which is fixed to bracket 136 by adjustor bolt 139, the bracket 136 being fixed to rear support plate 11. Fiber shear blade 142 is carried by heater 140 mounted to pivot 134.

FIG. 9, taken along line 9—9 of FIG. 8, shows the profile of cam slots 32, 34, 35, 36, which determine the vertical movement of cam followers 91, 127, 101, 111 respectively as the cam block 30 moves to the right. Slot 32 controls movement of upper clamp 92 while slot 35 controls the movement of lower clamp or anvil 100 (FIG. 8). Slot 36 controls the movement of shear bar 110 (FIG. 8) which moves downward stepwise as will be explained in conjunction with FIGS. 10A through 10F and returns under the action of spring 102 (FIG. 8). Pawl drive block 83 (see also FIG. 6) protrudes partially into slot 36 and acts on pin 38 as the cam block 30 returns leftward to pivot feed pawl lever 44 clockwise, which advances the pawl 43 to position two more plug members 1 for clamping the follower 111 passes by the drive block 183 through the portion of the slot 36 (away from the viewer) into which the block 183 does not protrude. During the initial or rightward movement of cam block, the feed pawl lever 44 rotates counterclockwise under the action of spring 45 to return the feed pawl 43, which bears resiliently against carrier strip 6 under the action of spring 46. Anti-backup pawl 48 and spring 49 mounted in lever 47 and acting on strip 6 opposite pawl 48 assure that the strip 6 will not back up. Cam slot 34 controls the movement of shear blade 142 (FIG. 8); not in particular the step in the lower profile of the cam slot 34 which effects positive return of the follower 127. This motion is described in greater detail in conjunction with FIGS. 11A and 11B.

Referring still to FIG. 9, it is apparent that rightward movement of cam block 30 will effect a ninety degree rotation of camming bar 66 by means of pin 68 fixed to block 30 acting on fork 67. Followers 72 are thus urged toward each other by springs 73, and arcuate clamping surfaces 71 on movable jaws 70 move toward arcuate clamping surfaces 51 on stationary jaws 50.

Figures 10A, 10B:
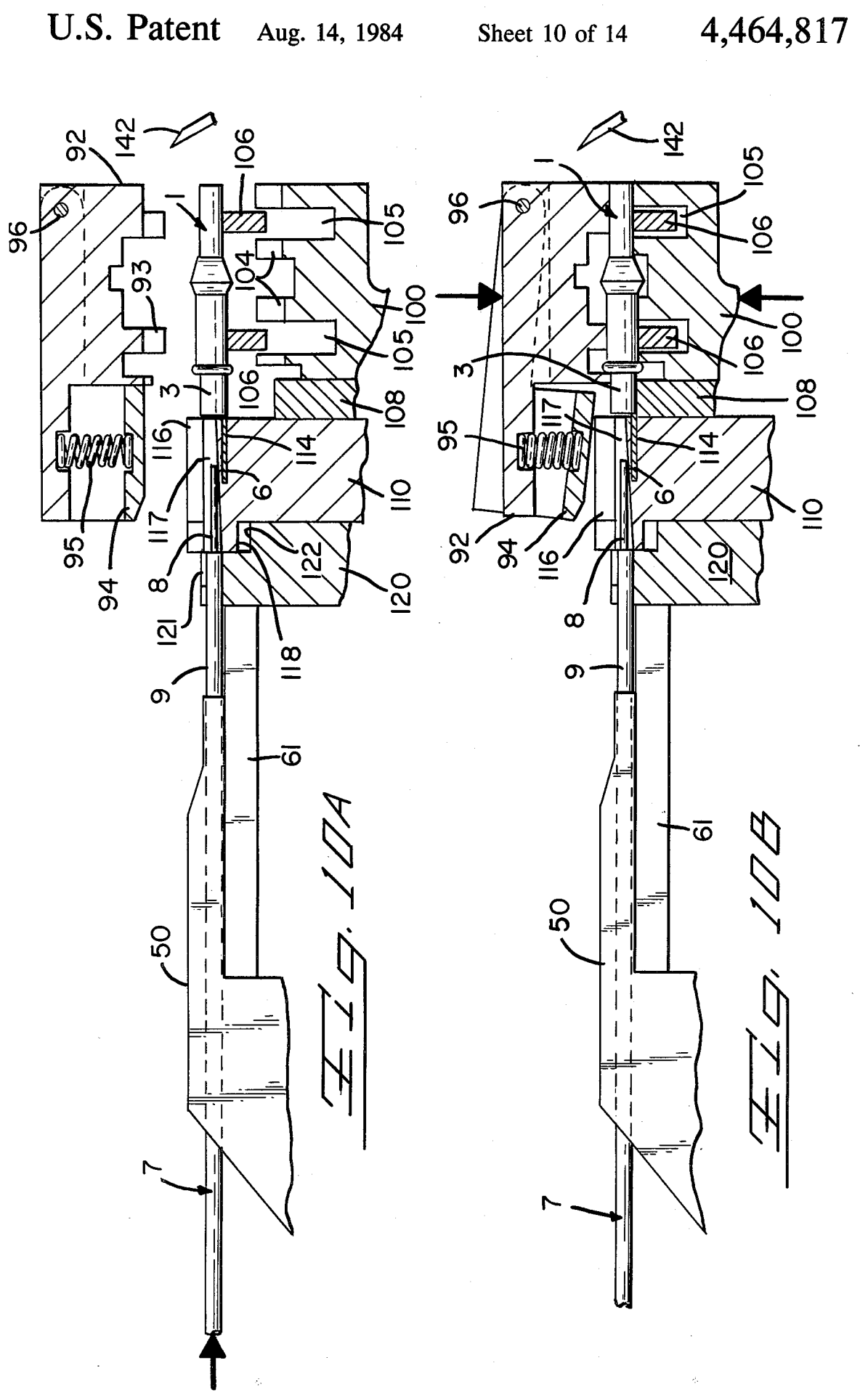

FIGS. 10A through 10F detail the sequence of operations in terminating the ends of cable 7 to a plug member 1. It will be helpful to refer to the timing diagram (FIG. 12) in conjunction with FIGS. 10A through 10F, as reference will be made thereto parenthetically. FIG. 10A shows the cable as positioned on upper rail 61 of crosspiece 60, adjacent stationary jaw 50. Note that exposed waveguide fiber 8 is positioned in fiber guide channel 117, which is profiled to closely receive the fiber 8 so that jacket 9 abuts the shear bar 110. FIG. 10B (about 50°) shows the plug member 1 firmly clamped between upper clamp 92 and anvil 100, where it nests in the upper cradles 93 and lower cradles 104 (FIG. 10A). Note that top fiber guide 94 bears against the top of shear bar 110 as the anvil 100 has risen just prior to downward travel of the shear bar 110 just prior to shearing strip 6 against shear blade 108. FIG. 10C (about 70°) shows the strip 6 sheared from plug member 1 as overhang 118 drops against ledge 122. The top guide plate 94 is now flush against the top of shear bar 110 and the cable 7 is being advanced into secondary cable guide channel 116, which is wide enough to accommodate the jacket 9 on the cable 7. FIG. 10D (about 100°) depicts the cable 7 advanced closer to the plug member 1, with the fiber 9 entering the sleeve 3. The shear bar 110 has begun a second stage of downward movement so that the jaws 50, 70 will clear the cable guide block 120 and the shear bar 110 as the cable 7 is advanced into the retention sleeve 3. FIG. 10E (about 160°) shows the jaws 50 passing over the cable guide block 120 and the shear bar 110 and abutting the retention sleeve 3 in the plug member 1. At this point the cutting blade 142 is against the back of the anvil 100 and poised for upward travel to shear waveguide fiber 8. FIG. 10F (about 300°) shows jaw 50 against the plug member 1 as the retention sleeve 3 is fully inserted and the cutting blade 142 has sheared the portion of fiber 8 protruding beyond the plug member 1. After this, the anvil 100 returns downward and the shear bar 110 moves upward as the jaws 50, 70 return with the terminated cable and finally release it.

FIGS. 11A and 11B detail the linkage for the cutting blade 142 discussed briefly in conjunction with FIG. 8. FIG. 11A corresponds to FIG. 10E (about 300°), showing the blade 142 poised to move upward against anvil 100. Follower 127 riding in cam slot 34 has moved the hot blade pivot holder 126 downward as the cam block 30 passed through the initial 180° (rightward stroke in FIG. 9). This action compresses spring 130 against pin 132 mounted in stationary rear support plate 11 so that the holder 126 will be urged resiliently upward during the return stroke of block 30. During the downward stroke of holder 126, the bolt 139 passes through slot 145 in fixed bracket 136 until stop nuts 143 hit the bracket 136, at which point the blade support pivot 134 pivots about pin 135 carried in pivot holder 126. Spring 137 extending between holder 126 and rod end 138 thus passes over the center of pin 135 to rotate the pivot 134 and heater 140 so that blade 142 rests resiliently against anvil 100. During the return stroke of block 30, the pivot holder 126 is not urged upward positively as the cam slot 34 (FIG. 8) is not profiled to initially direct upward movement of the follower 127. Rather, the spring 130 urges the holder 126 upward until the blade 142 contacts the fiber 8 as shown in FIG. 11B. The blade 142 is heated by heater 140 and will remain against the fiber 8 until it is sufficiently hot to melt and allow a smooth, polished shear of the optical plastic. If the resilient action of spring 130 does not provide sufficient force to permit shearing of the fiber, the follower 127 will eventually be forced upwards positively by the profile of cam slot 34 (FIG. 9). Upward travel of the holder 126 will eventually cause the lower stop nuts 144 to abut the bottom of bracket 136, and the pivot 134 will rotate clockwise until the spring 137 passes over the center of pin 135 and the blade 142 will be held resiliently away from anvil 100 as shown in FIG. 8.

Figure 12:
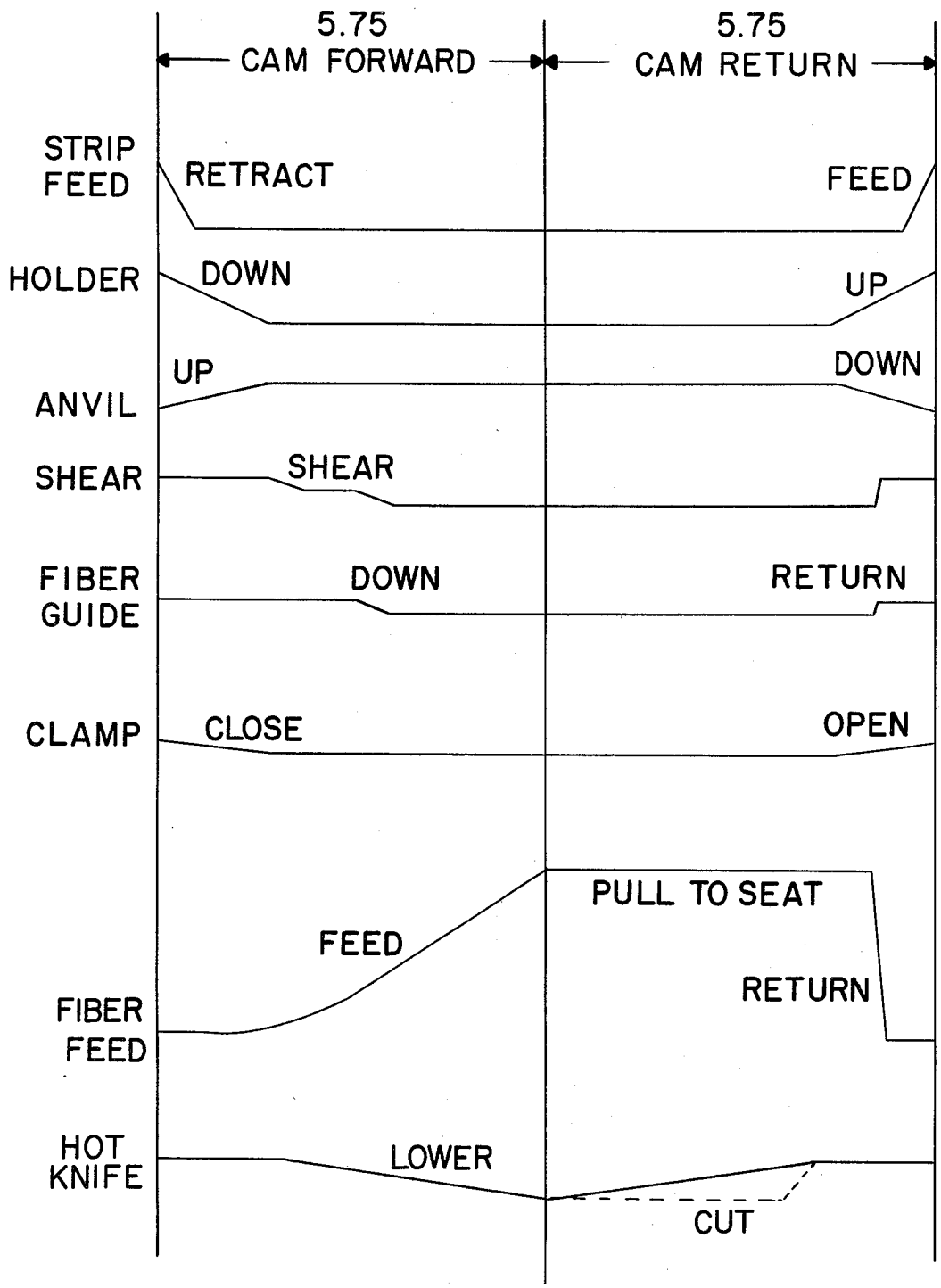
FIG. 12 is a timing diagram.

FIG. 12 is a timing diagram which shows the relative positions of various components as the top cam plate 20 and rear cam block 30 move forward 5.75 inches (first 180°), then return 5.75 inches (second 180°).

We claim:

1. Apparatus for applying a connector to a fiber optic cable which has the jacket cut and stripped from the end thereof to expose the waveguide fiber, said connector being of the type comprising a plug member having a metal retention sleeve therein, said sleeve serving to grip the jacket of the cable and the plug member to position the fiber positively relative to the end of the plug member, comprises the following:

a cable insertion station where said plug member is gripped securely between upper and lower clamping means, delivery means for delivering said plug member along a delivery path to said insertion station, said plug member being one of a plurality of plug members attached to a carrier strip, cable clamping and advancing means for clamping said cable and advancing the cut and stripped end of said cable along a feed path toward said insertion station and through said plug member so that the exposed fiber protrudes therefrom, guide means on said feed path adjacent to said insertion station, said guide means comprising a secondary cable guide channel profiled to closely accommodate said jacket and a fiber guide channel therebelow profiled to closely accommodate said fiber, said fiber guide channel opening into said secondary cable guide channel, said fiber guide channel being positioned on said feed path prior to clamping said cable, moving means for moving said guide means after clamping said cable, said moving means being effective to move said fiber guide channel from said feed path after clamping said cable and prior to advancing same, said secondary cable guide channel being positioned on said feed path during initial advance of said cable, whereby, said jacket may be positively positioned relative to said plug member at said insertion station by inserting said fiber in said fiber guide channel with said jacket against said fiber guide channel prior to clamping said cable.

2. The apparatus of claim 1 wherein said channels are profiled in a shear bar having a slot therein parallel to said delivery path, said slot receiving said carrier strip therethrough, said shear bar moving down to move said guide channels from said feed path, said slot moving against an adjacent shear blade to shear said carrier strip therefrom.

3. The apparatus of claim 1 wherein said clamping and advancing means comprises a pair of jaws which move parallel to said feed path, said jaws advancing said cut and stripped end of said cable toward said insertion station and into said retention sleeve, which protrudes from said plug member, until said jaws about said retention sleeve and push said sleeve into said plug member, said jaws thereafter retreating slightly under the action of a resilient spring, whereby said cable is positively seated in said sleeve, said sleeve having internal lances therein which grip said jacket, and said sleeve is positively seated in said plug member, said sleeve having external lances thereon which grip said plug member.

4. The apparatus of claim 1 in which said guide means further comprises a primary cable guide channel adjacent said fiber guide channel opposite said insertion station, whereby said primary channel aligns said jacket so said fiber readily aligns in said fiber guide channel.

5. The apparatus of claim 4 wherein said primary guide channel is profiled in the top of a cable guide block adjacent said bar, said bar moving relative to said guide block until said secondary cable guide channel is axially aligned with said primary cable guide channel for initial advance of said cable, said shear bar having means cooperable with said guide block to move same from said feed path with said shear bar as said clamping and advancing means approaches said insertion station.

6. An apparatus as in claim 1 characterized in that said guide means further comprises a guide block having a primary cable guide channel profiled in the top thereof, said guide block being adjacent said bar opposite said insertion station with said channel axially aligned with said connector channel prior to clamping said cable and remaining stationary as said secondary cable guide channel moves onto said feed path, said cable guide channels being axially aligned during initial advance of said cable, said bar having means cooperable with said block to move same from said path with said bar as said jaws approach said insertion station.

7. The apparatus of claim 1 characterized in that said apparatus is directed to a connector of the type comprising a plug member having a metal retention sleeve therein which protrudes therefrom, said sleeve having internal lances which grip said jacket and external lances which grip said plug member, said apparatus further comprising resilient spring means which causes said jaws to retreat slightly to seat said cable in said sleeve after said jaws have advanced to push said sleeve into said plug member to seat said sleeve in said plug member.

8. An apparatus for inserting the end of a filamentous lead into a connector, said apparatus being of the type comprising a pair of jaws movable relatively toward each other to clamp said lead therebetween, said jaws being thereafter movable as a unit to advance said lead axially along a feed path to an insertion station where said connector is held, characterized in that said apparatus is directed to applying a connector to a fiber optic cable having the jacket cut and stripped from the end thereof to expose the waveguide fiber, said apparatus further comprising guide means on said feed path adjacent to said insertion station for guiding the cut and stripped end of said cable toward said connector as said jaws advance said end toward said insertion station, said guide means comprising a secondary cable guide channel profiled to closely accommodate said jacket and a fiber guide channel therebelow profiled to closely accommodate said fiber, said fiber guide channel opening into said secondary cable guide channel, said fiber guide channel being positioned on said feed path prior to clamping said cable, said apparatus further comprising moving means, said moving means being effective to move said fiber guide channel from said feed path after clamping said cable and prior to advancing same, said secondary cable guide channel being positioned on said feed path during initial advance of said cable.

* * * * *